Jan. 18, 1966 H. R. CHAPIN 3,230,328
ADJUSTABLE PRESSURE SWITCH HAVING POSITIVE RESET MEANS
Filed Aug. 23, 1962 2 Sheets-Sheet 2
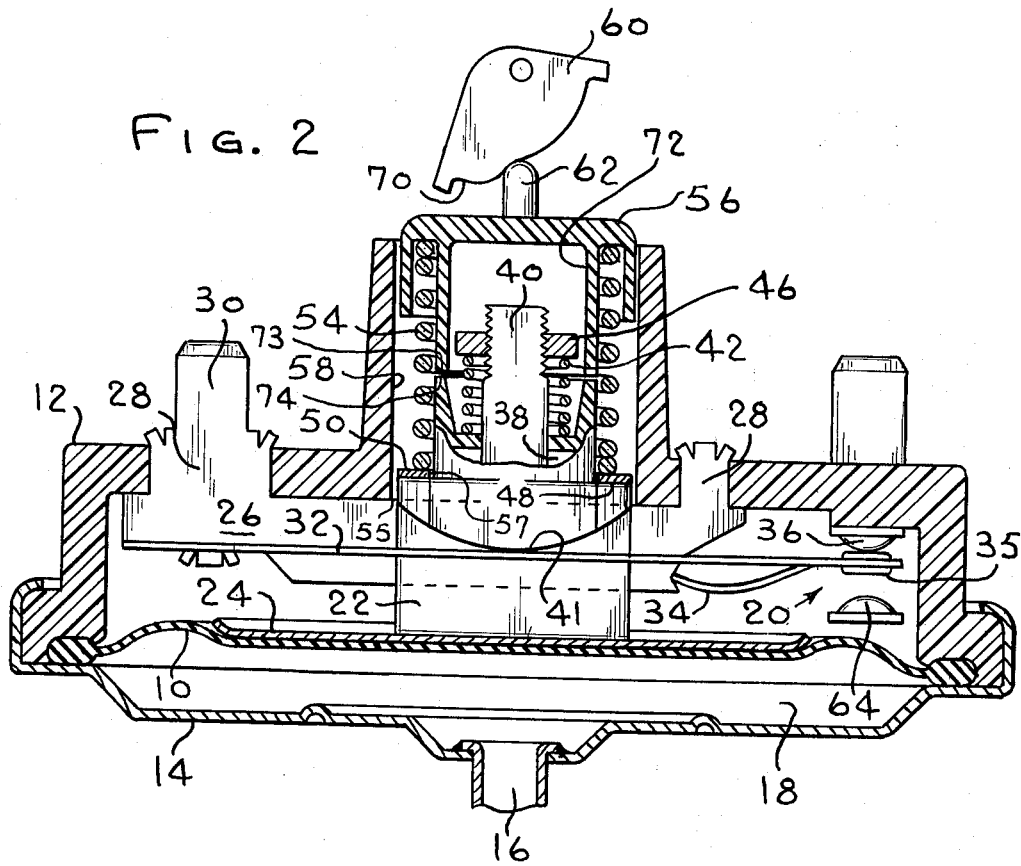
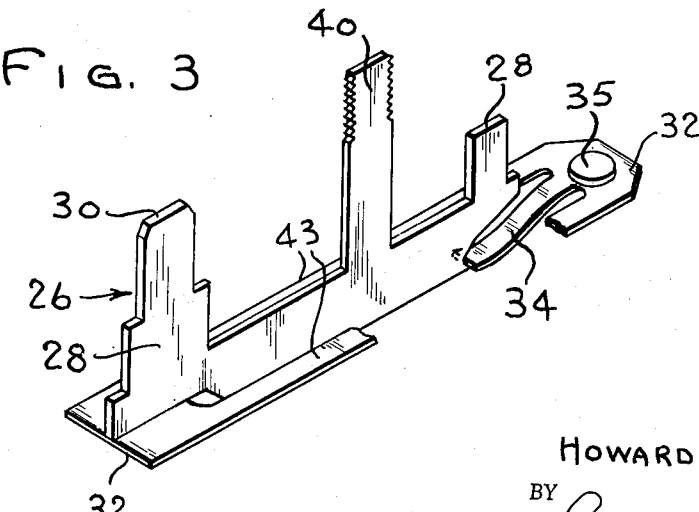
INVENTOR.
HOWARD R. CHAPIN
BY
*Bayard K. Michael*
ATTORNEY

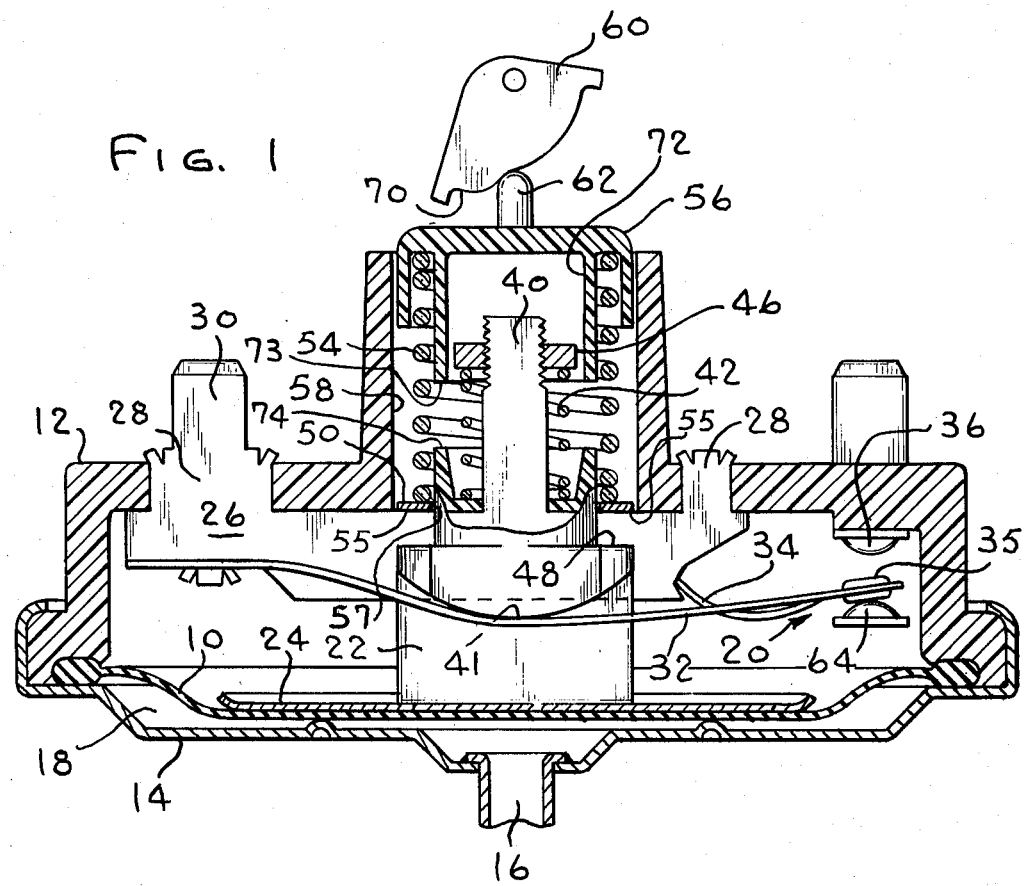

United States Patent Office 3,230,328
Patented Jan. 18, 1966

3,230,328
ADJUSTABLE PRESSURE SWITCH HAVING
POSITIVE RESET MEANS
Howard R. Chapin, Park Ridge, Ill., assignor to Controls Company of America, Schiller Park, Ill., a corporation of Delaware
Filed Aug. 23, 1962, Ser. No. 218,951
15 Claims. (Cl. 200—83)

This invention relates to pressure sensitive switch devices and particularly to devices which are used to control the water level in automatic washing machines.

Switches of this type are used to control the level of a liquid within a container in response to the pressure head of the liquid. When the preselected level is reached the filling operation is stopped and another operation initiated. When the container is drained, it is generally desirable to initiate a second operation when the liquid has reached a predetermined level. This level may be either fixed with respect to the container, fixed with respect to the maximum level, or varied at a fixed proportion with respect to the maximum level.

The primary object of this invention is to provide an improved pressure sensitive device which can be quickly and easily adapted to provide any one of the above characteristics.

This object is accomplished by providing a fixed switch blade support within the housing of a pressure responsive device which acts to guide the motion of a switch actuator. The switch actuator is biased against a pressure responsive diaphragm by one or more springs depending on the type of operation required. If a fixed reset level with respect to the container is to be used, then one spring will be provided to act between the blade support and the switch actuator and a second spring between a manually adjustable spring retainer in the housing and the switch actuator. The second spring is rendered ineffective in the draining cycle. If a fixed differential is desired between the maximum level and the reset level, the second spring is eliminated, and the first spring controlling both the maximum and reset levels. If a variable differential is to be used, the first spring is positioned between the spring retainer and the switch actuator so that the bias of both springs can be manually varied.

Other objects and advantages will be pointed out in or be apparent from the specification and claims, as will obvious modifications of the embodiment shown in the drawings, in which:

FIG. 1 is a view in section showing the switch in the normal position;

FIG. 2 is a view in section showing the switch in the full position;

FIG. 3 is a projection view showing the switch blade support;

FIG. 4 is a side view of the switch actuator;

FIG. 5 is a top view of the switch actuator; and

FIG. 6 is a partial sectional view illustrating a structural variation which is a possible use of the construction of this invention.

Referring to the drawings in detail, a resilient diaphragm 10 is shown sealed between cupped shaped housing 12 and the enclosure plate 14. An inlet 16 is provided in the enclosure plate and is adapted for connection to a pressure source (not shown). Variations in pressure in chamber 18 will cause the diaphragm to move upward within the housing. The motion of the diaphragm is transferred to switch 20 by switch actuator 22 which is biased against diaphragm pad 24 by one or more springs as described below.

The switch includes a blade support 26 which is secured to the housing by vertical projections 28. One of the projections is extended upward to form terminal 30 which is adapted to be connected to an electric circuit. Switch blade 32 is secured at one end to the blade support and carries a common contact 35 at its other end. A curved spring 34 acts against the blade support to snap the blade into engagement with either full contact 36 or reset contact 64.

The switch blade is normally forced downward into engagement with the reset contact by reset spring 42 which is compressed between nut 46 on threaded extension 40 of the blade support and the switch actuator. The switch actuator is slotted at 38 and mounted on the blade support with bosses 41 on either side of the actuator riding on rails 43 of the switch blade. Nut 46 can be adjusted to vary the force of the reset spring acting on the actuator. The upward motion of the switch actuator is momentarily stopped when flange 48 on the actuator engages plate 50. The plate is positioned on ledge 55 in aperture 58 on the top of the housing and has a central aperture 57 to allow the switch actuator to move freely with respect to the plate. Calibrating spring 54 is compressed between calibrating spring retainer 56 and the plate to bias the plate downward against the ledge. The compressive force of the calibrating spring is varied by manually rotating cam 60 which acts on follower 62 to move the spring retainer up or down with respect to the housing.

As the pressure below the diaphragm 10 increases from the position shown in FIG. 1, the diaphragm will move upwardly and will take up the lost motion between shoulder 48 and plate 50 to pick up the second spring 54. In taking up this lost motion the switch blade has not gone over center and, hence, remains on the lower contact 64. The pressure under the diaphragm now has to work against the combined force of both springs and as the pressure increases enough to overcome this force the diaphragm will continue its upward motion until the blade goes over center to swing contact 35 into engagement with upper contact 36. The flow of water is then turned off stopping the flow of water into the machine. When the water is drained from the machine, the calibrating spring will force the diaphragm downward until the plate seats on the ledge in the housing. Resetting of the switch blade will then be dependent solely on the force of the reset spring acting on the diaphragm. Since this is a constant force, resetting will always occur at the same pressure thereby establishing a fixed water level for resetting.

If the operator of the machine wishes to fill the machine beyond the limits of the pressure switch, the cam is provided with an overload surface 70. Rotating of the cam until this surface engages the cam follower will move surface 73 on the bottom of cylinder 72 down far enough to contact surface 74 on the actuator so the parts "go solid" and the cam then acts directly on the actuator to drive it down to reset the switch. The surface 70 is contoured so that it must be manually held in this position. When the cam is released the force of the calibrating spring will rotate the cam to the high level position. The head pressure of the high level of water in the machine will immediately lift the plate off of the housing allowing the switch blade to move into engagement with the full contact.

If the pressure responsive device is to be used with a constant differential between the full level and the reset level, the calibrating spring and plate are removed from the housing. A stronger reset spring may be substituted for the reset spring used in the fixed water level switch. The adjusting nut is then used to set the high water level. When the container is being filled the diaphragm will move pushing the switch actuator upward until the switch blade has moved far enough to allow spring 34 to trip the switch blade into engagement with the full contact.

On draining the container, the reset spring will force the diaphragm downward until the switch blade has moved far enough to allow spring 34 to move the switch blade into engagement with the reset contact. The difference between the full water level and the reset water level will be the same for any setting of the adjusting nut.

If the pressure responsive device is to be used as a variable differential device, the adjusting nut is removed and the reset spring is allowed to seat within inner cylinder 72 of the spring retainer. This variation is illustrated in FIG. 6 where it can be seen that adjusting nut 46 has been removed and a longer reset spring 42′ has been substituted so that it is capable of extending to and engaging the underside of cap 56. Any adjustment of the compressive force of the calibrating spring will also produce a corresponding change in the compressive force of the reset spring. The reset water level will always be changed in accordance with the change in the high water level.

Although only one embodiment of the present invention has been illustrated and described, it will be apparent to those skilled in the art that various changes and modifications may be made therein without departing from the spirit of the invention or from the scope of the appended claims.

I claim:
1. A control device comprising,
pressure responsive means,
switch means biased into engagement with a first fixed contact,
a switch actuator connected to and movable with said pressure responsive means to respond to the motion of the pressure responsive means and operatively connected to the switch means,
first adjustable biasing means including spring means connected to said switch actuator and biasing the switch actuator in a direction to move said switch means against a second fixed contact when a predetermined pressure acts on the pressure responsive means,
and second adjustable biasing means positioned in the path of movement of said switch actuator to engage said switch actuator, said second biasing means opposing movement of said actuator to move said switch means into engagement with said first fixed contact and operable to determine the pressure necessary for the pressure responsive means to move the switch actuator far enough to allow said switch means to move into engagement with said first fixed contact,
whereby said switch means is released for movement to said first fixed contact when the pressure on said pressure responsive means exceeds the biasing force of said second adjustable spring means,
said first biasing means also including means defining a seat for said spring means and means supporting said seat for movement independently of said second biasing means and with respect to said switch actuator to adjust the biasing force exerted on said switch actuator by said spring means, and
said first and second adjustable biasing means extending from said actuator in a direction away from said pressure responsive means and being exposed for access from exteriorly of said pressure responsive means without disturbing either said pressure responsive means or said actuator.

2. A control device according to claim 1 wherein said second biasing means includes a plate member positioned in the path of motion of the switch actuator, said switch actuator includes a flange engageable with said plate when the actuator has been moved through a predetermined distance, and said second biasing means including adjustable spring means engaging said plate and biasing said plate against motion thereof by the switch actuator, the bias of said adjustable spring means and the first biasing means determining the pressure required for the pressure responsive means to move the switch actuator far enough to allow the switch means to move into engagement with the first fixed contact.

3. A control device according to claim 2 wherein said second biasing means also includes over-riding means connected to said adjustable spring means and operative to selectively engage said actuator and prevent the pressure responsive means from moving the switch actuator far enough to allow the switch means to move into engagement with said first fixed contact.

4. A control device according to claim 3 wherein said over-riding means includes means for manually operating said over-riding means and arranged with said adjustable spring means to render said over-riding means ineffective when said over-riding means is released.

5. A control device which is responsive to the head pressure of a fluid in a container comprising,
a housing,
a resilient diaphragm separating the housing into a pressure chamber and a switch chamber,
means for connecting the pressure chamber to the container so the diaphragm moves in response to changes in the level of fluid in the container,
a switch blade support and a pair of fixed contacts mounted in the switch chamber,
a switch blade mounted on the switch blade support and including means for biasing the switch blade into engagement with one of the fixed contacts,
switch actuator means mounted on the support and connected to said diaphragm to respond to the motion of the diaphragm, said switch actuator also operatively connected to the switch blade, and first biasing means including first spring means seated between the support and the actuator to bias the actuator into engagement with the diaphragm so that the actuator follows the motion of the diaphragm and including means for adjusting the bias of the spring means, said first biasing means moving said actuator to move the switch blade into engagement with the other fixed contact when a predetermined pressure acts on the diaphragm, and said switch blade being released for movement into engagement with the said one contact when a second predetermined pressure exceeding the biasing force of said first spring means acts on the diaphragm, said first spring means extending from said actuator means in a direction away from said diaphragm and being exposed for access from exteriorly of said housing without disturbing said diaphragm or said actuator means.

6. A control device according to claim 5 wherein a second spring means is arranged in the path of movement of said switch actuator for engagement with the switch actuator after it has moved a predetermined distance, the force of the first and second spring means determining the second predetermined pressure required to move the switch blade into engagement with said one contact.

7. A control device comprising,
a housing,
pressure responsive means positioned within said housing,
switch means mounted within said housing and operatively connected to the pressure responsive means,
said switch means being movable between a full position and a reset position,
first adjustable spring means connected to said switch means and opposing movement of said switch means from said reset position to the full position so that said switch means moves to said full position when a first predetermined pressure is applied to the pressure responsive means,
and adjustable reset means including spring means engaging and biasing said switch means to said reset position and operative to move said switch means from the full to the reset position when the pressure acting on said pressure responsive means has been reduced to a second predetermined pressure, said reset means also including means defining a seat for said second spring means and supporting said seat for adjustment independently of said adjustable spring means and with respect to said switch means to adjust the force biasing said switch means to said reset position.

8. A control device comprising, a housing, pressure responsive means positioned in said housing, switch means mounted within said housing and operatively connected to the pressure responsive means, said switch means being movable between a full position and a reset position and including a blade support mounted within said housing, a switch blade having one end secured to the blade support, and an integral spring acting between the blade support and the switch blade to bias the switch blade into said full position, adjustable spring means connected to said switch means and opposing movement of said switch means from said reset position to the full position so that said switch means moves to said full position when a first predetermined pressure is applied to the pressure responsive means, adjustable reset spring means connected to and biasing said switch means to said reset position and operative to move said switch means from the full position to the reset position when the pressure acting on said pressure responsive means has been reduced to a second predetermined pressure, and adjusting means engaging both of said spring means and operative to simultaneously adjust both spring means whereby the second predetermined reduced pressure is a proportion of the first predetermined pressure.

9. A control device according to claim 8 including a switch actuator slidably mounted on said blade support and operatively engaging said switch blade and said pressure responsive means for transmitting movement of said pressure means and spring means to said switch blade for actuation thereof between full and empty positions.

10. A pressure responsive control device comprising, in combination, a housing, diaphragm means connected in said housing and dividing the housing interior into a pressure chamber and a switch chamber, means for connecting said pressure chamber to a source of varying pressure so that said diaphragm moves in accordance with variations in pressure in said pressure chamber, switch means in said switch chamber having high and low pressure positions, means defining an opening in said housing for providing communication to said switch chamber from exteriorly of said housing, an actuator connected to said diaphragm for movement therewith and connected to said switch means for translating diaphragm movement in response to pressure variations into movement of said switch means, said actuator aligned with and movable in said housing opening, first spring means positioned at said opening in engagement with said actuator and extending from said actuator in a direction away from said switch chamber, means in said opening for seating said first spring means including a first member fixed with respect to said housing and a second member adjustably and releasably supported on said first member and engaging said first spring means, said second member spaced outwardly from said actuator in a direction away from said switch chamber so that said actuator is biased toward and follows the movement of said diaphragm means, second spring means positioned at said opening in the path of movement of said actuator for engagement by said actuator and extending in a direction away from said switch chamber, and adjustable retaining means spaced outwardly of and in registry with said opening and said first and second spring means, said second spring means engaging said retaining means so that when said second spring means engages said actuator it biases said actuator toward said diaphragm.

11. A pressure responsive control device comprising, in combination, a housing, diaphragm means connected in said housing and dividing the housing interior into a pressure chamber and a switch chamber, means for connecting said pressure chamber to a source of varying pressure so that said diaphragm moves in accordance with variations in pressure in said pressure chamber, switch means in said switch chamber having high and low pressure positions, means defining an opening in said housing for providing communication to said switch chamber from exteriorly of said housing, adjustable retaining means spaced outwardly of and in registry with said opening, an actuator connected to said diaphragm for movement therewith and connected to said switch means for translating diaphragm movement in response to pressure variations into movement of said switch means, said actuator aligned with said housing opening, first spring means positioned at said opening in engagement with said actuator and extending from said actuator toward said retaining means, means in said opening for seating said first spring means including a first member fixed with respect to said housing and a second member adjustably and releasably supported on said first member intermediate said actuator and said retaining means, said first spring means engaged between said actuator and said second member so that said first spring means biases said actuator toward said diaphragm means, and second spring means disposed at said opening and arranged in the path of movement of said actuator for engagement thereby, said second spring means extending in a direction away from said actautor and toward and engaging said adjustable retaining means so that when said second spring means engages said actuator said actuator is biased toward said diaphragm.

12. A pressure responsive control device comprising, in combination, a housing, diaphragm means connected in said housing and dividing the housing interior into a pressure chamber and a switch chamber, means for connecting said pressure chamber to a source of varying pressure so that said diaphragm moves in accordance with variations in pressure in said pressure chamber, switch means in said switch chamber having high and low pressure positions, means defining an opening in said housing for providing the communication to said switch chamber from exteriorly of said housing, adjustable retaining means spaced outwardly of and in registry with said opening, an actuator connected to said diaphragm for movement therewith and connected to said switch means for translating diaphragm movement in response to pressure variations into movement of said switch means, said actuator aligned with and movable in said housing opening, first spring means positioned at said opening in engagement with said actuator and extending from said actuator toward and engaging said retaining means, and a support connected to said housing and including a portion extending from said switch chamber through said opening and toward said retaining means, said portion of said support including means for receiving a spring seat and for supporting said spring seat in spaced relation from and for adjustable movement with respect to said support.

13. The combination of claim 12 wherein said actuator is supported on said support for movement on said support and in said opening.

14. The combination of claim 13 wherein said switch means is mounted on said support.

15. The combination of claim 14 including a spring seat releasably and adjustably connected on said support portion and a spring seated between said spring seat and said actuator and between said actuator and said retaining means to bias said actuator and said switch means toward said low pressure position.

References Cited by the Examiner

UNITED STATES PATENTS

| | | | |
|---|---|---|---|
| 2,480,538 | 8/1949 | Barr | 200—83 |
| 2,595,967 | 5/1952 | McCloy | 200—83 |
| 2,636,093 | 4/1953 | Clark et al. | 200—83 |
| 3,110,784 | 11/1963 | Williams et al. | 200—83 |

BERNARD A. GILHEANY, *Primary Examiner.*